US008614533B2

(12) United States Patent
Bahadir

(10) Patent No.: US 8,614,533 B2
(45) Date of Patent: Dec. 24, 2013

(54) ELECTRIC MOTOR

(76) Inventor: Aydin Bahadir, Istanbul (TR)

( * ) Notice: Subject to any disclaimer, the term of this patent is extended or adjusted under 35 U.S.C. 154(b) by 162 days.

(21) Appl. No.: 12/741,588

(22) PCT Filed: Oct. 28, 2008

(86) PCT No.: PCT/EP2008/064567
§ 371 (c)(1),
(2), (4) Date: May 5, 2010

(87) PCT Pub. No.: WO2009/059910
PCT Pub. Date: May 14, 2009

(65) Prior Publication Data
US 2010/0225194 A1 Sep. 9, 2010

(30) Foreign Application Priority Data
Nov. 5, 2007 (TR) ............... A2007/07564

(51) Int. Cl.
*H02K 1/28* (2006.01)
*H02K 3/51* (2006.01)
*H02K 3/42* (2006.01)

(52) U.S. Cl.
CPC .. *H02K 3/51* (2013.01); *H02K 1/28* (2013.01); *H02K 3/42* (2013.01)
USPC ...... 310/216.113; 310/216.058; 310/216.099; 310/216.106; 310/216.108; 310/271

(58) Field of Classification Search
CPC .............. H02K 3/51; H02K 1/28; H02K 3/42
USPC .............. 310/216.58, 216.99, 262, 271, 263, 310/216.106, 216.108, 216.113, 156.28
IPC ........................................... H02K 1/28
See application file for complete search history.

(56) References Cited

U.S. PATENT DOCUMENTS

| 2,630,463 | A | * | 3/1953 | Smith | 310/271 |
| 3,173,194 | A | | 3/1965 | Applegate | |
| 4,363,986 | A | * | 12/1982 | Joho et al. | 310/214 |
| 4,893,042 | A | | 1/1990 | Tanaka | 310/216.016 |
| 5,903,083 | A | * | 5/1999 | Mukai et al. | 310/263 |
| 6,737,780 | B1 | * | 5/2004 | Fisher et al. | 310/154.03 |
| 6,864,609 | B2 | * | 3/2005 | Fisher et al. | 310/154.08 |
| 6,885,120 | B2 | * | 4/2005 | Kaminski et al. | 310/85 |
| 2004/0080232 | A1 | * | 4/2004 | Gilliland et al. | 310/254 |
| 2005/0073215 | A1 | * | 4/2005 | Wang et al. | 310/261 |
| 2010/0225194 | A1 | * | 9/2010 | Bahadir | 310/216.058 |

FOREIGN PATENT DOCUMENTS

| DE | 9106990 U1 | 10/1992 |
| DE | 102004025226 A1 | 12/2005 |
| EP | 0307663 A | 3/1989 |
| GB | 700141 | 11/1953 |
| JP | 61157247 A | 7/1986 |

* cited by examiner

*Primary Examiner* — John K Kim
(74) *Attorney, Agent, or Firm* — Venable, Campillo, Logan & Meaney PC

(57) ABSTRACT

The present invention relates to an electric commutator motor (1) that comprises a stator (2) and a rotor core (3), wherein the magnetic flux transmittance between the rotor (3)-stator (2) is improved and the noise level is reduced by securing a ferromagnetic rotor sleeve (5) on the outer circumference press-fittingly. The sleeve is made of a ring shaped ferromagnetic laminations.

17 Claims, 3 Drawing Sheets

ELECTRIC MOTOR

Figure 1:
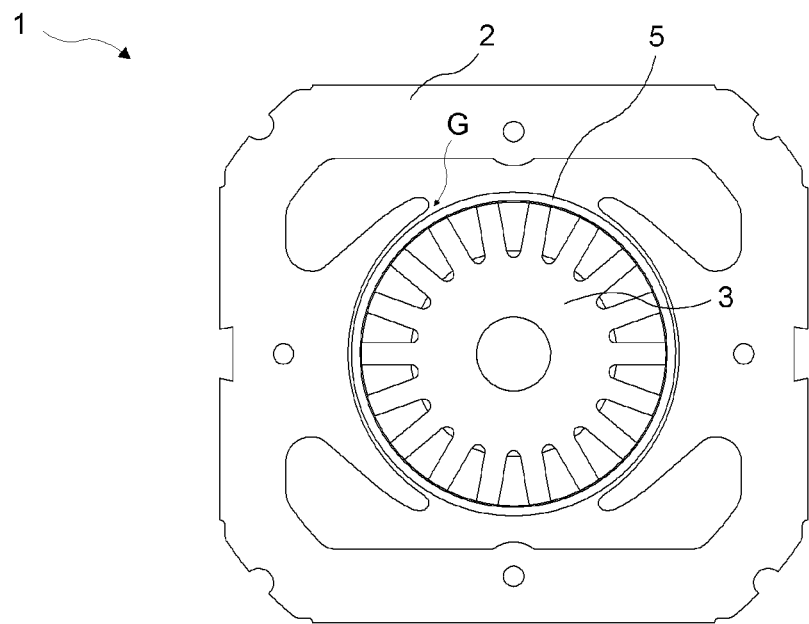

The present invention relates to an electric motor that comprises a stator and a rotor rotating within the stator.

In electric motors, the rotor windings are wound to the winding slots situated in the rotor core configured as a cylindrical stack of laminations heaped one over the other. The winding slots divide the outer circumference of the rotor core into separated segments creating geometric discontinuity. This discontinuity results in the increase of noise during the operation of the motor due to magnetic and aero-acoustic signals.

Generally, cylindrical sleeves manufactured of magnetic or non-magnetic materials or plastic bands that entirely wrap the outer circumference of the rotor, secured on the rotor by shrink method are used for preventing the discontinuity on the outer circumference of the rotor and hence the increase of noise.

In the conventional technique, frequently the outer circumference of the rotor core is covered by thin plastic foil band and the rotor winding slots are closed. The plastic foil, since disposed in the air gap between the rotor and stator, which is considerably narrow and plays an effective role in the working performance, is torn by rubbing during the operation of the motor and moreover the plastic film can melt due to heat and be damaged.

In the conventional technique, thin tubular metal sleeves are secured on the outer circumference of the rotor core. In order to maintain the magnetic flux passage between the rotor-stator, the metal sleeves are produced of magnetic material but since the eddy currents created in the axial direction prevent the transmittance of magnetic flux, a decrease in the motor performance is observed even though the increase in noise level is obviated, and the desired revolution and torque values cannot be attained.

In the conventional art, furthermore during the production of the electric motor, the operation of the electric motor is tested by a balance machine, opening balancing grooves on certain regions of the rotor core thus the imbalances of the rotor core in unbalanced regions are eliminated by metal removing method. If more imbalances occur during production, the depths of the balancing grooves opened by the balance machine will be more; if fewer imbalances occur then the depths of the balancing grooves opened by the balance machine will be less. When balancing grooves are opened by fitting a thin rotor sleeve on the rotor, the balancing grooves having greater depth project out from the rotor sleeve to the rotor core.

In the Great Britain Patent No GB 700141, a dynamo-electric machine is described wherein a tight fit tubular sleeve produced of magnetic steel material is secured over the rotor core by pressing or shrinking. Slots are opened on the tubular rotor sleeve secured over the rotor core for preventing eddy currents. The sleeve secured on the rotor is divided by slots into a series of circumferential bands for preventing eddy currents. The bands separated by slots are joined to each other by webs.

In the European Patent No EP0307663, in an electric motor used in domestic appliances, the outer circumference of the rotor core formed of stacked laminations and the cylindrical inner hole of the stator are covered by a plastic foil band such that the surfaces of the rotor and stator facing each other become smooth and the noise level is reduced.

The aim of the present invention is the realization of an electric motor comprising a rotor sleeve secured on the cylindrical outer circumference of the rotor core for reducing the noise level and improving the magnetic flux transmittance.

The electric motor realized in order to attain the aim of the present invention is explicated in the claims.

The electric motor of the present invention is constituted of a stator and rotor configured by stacking ferromagnetic laminations and comprises a rotor sleeve formed of stacking ring shaped ferromagnetic laminations like in the stator and the rotor and secured on the cylindrical outer circumference of the rotor core by pressing-fit operation. The rotor sleeve covers the discontinuities on the cylindrical outer circumference of the rotor core due to the winding slots, preventing increase in noise during the operation of the motor and acts like the continuity of the rotor due to stacked laminations structure and prevents the eddy currents adversely affecting the working performance of the motor by improving the magnetic flux transmittance between the rotor-stator. Due to stacked laminations structure of the rotor sleeve, slots or similar configurations that create discontinuity and weaken the magnetic flux transmittance between the rotor-stator are not used for preventing eddy currents.

The rotor sleeve is produced in the same lamination die as the laminations forming the stator and the laminations forming the rotor core from the same steel sheet material and convenience of production is provided.

Locking protrusions are provided on each lamination forming the rotor sleeve as in the rotor and stator and these laminations are interlocked to each other by means of the locking protrusions and constitute the stack structured rotor sleeve.

The rotor sleeve of the present invention provides an advantage in the balancing process performed by the balance machine. Balancing grooves are opened on the rotor core by metal removing method and a better balancing process is performed since discontinuities are not present on the outer circumference of the rotor sleeve like the winding slots on the rotor core. The rotor sleeve does not have to be very thin as in known implementations; the thickness can be greater for the balancing process and does not inhibit the uniform flux transmittance by means of the stacked lamination configuration.

The electric motor realized in order to attain the aim of the present invention is illustrated in the attached claims, where:

FIG. 1—is the schematic view of an electric motor.

Figure 2:
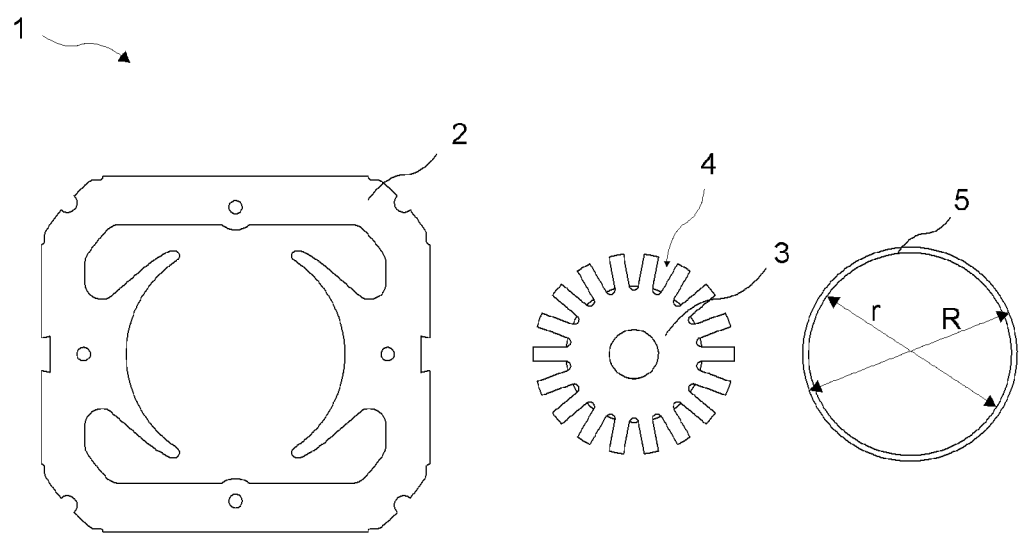

FIG. 2—is the exploded view of an electric motor.

Figure 3:
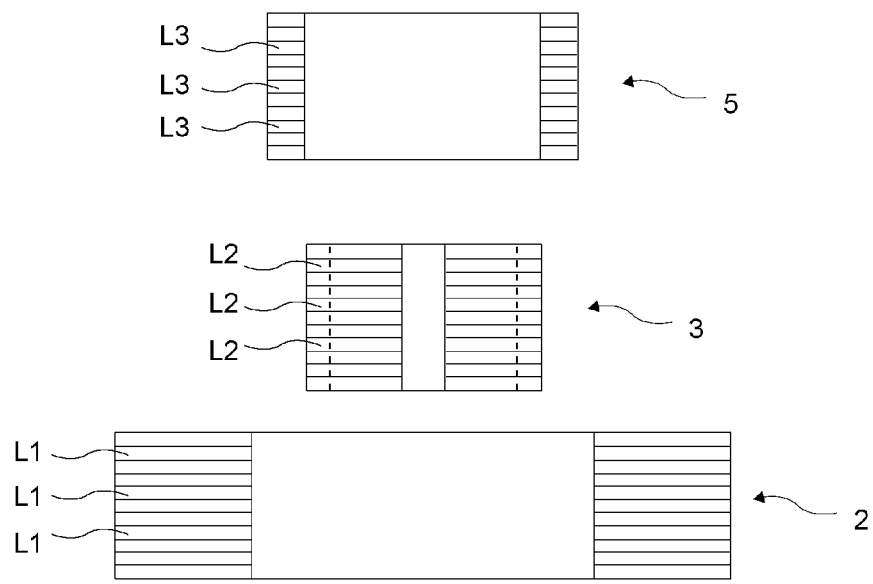

FIG. 3—is the schematic view of a stator, a rotor and a rotor sleeve formed of laminations.

Figure 4:
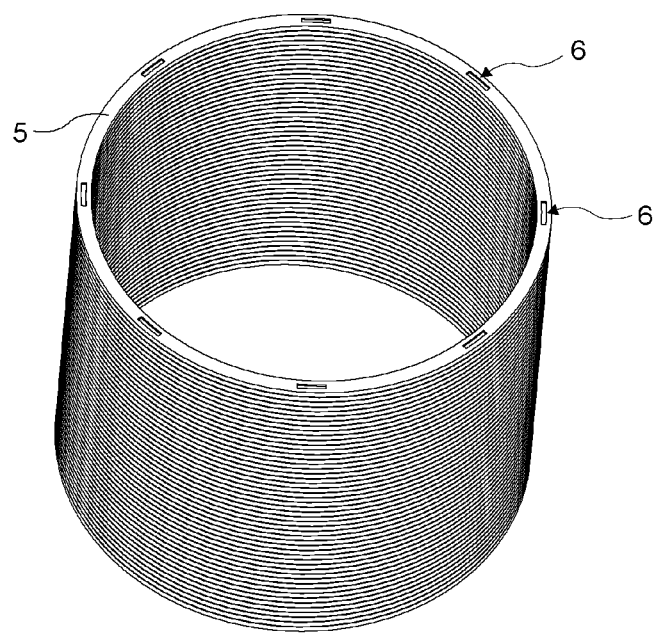

FIG. 4—is the perspective view of a rotor sleeve.

Figure 5:
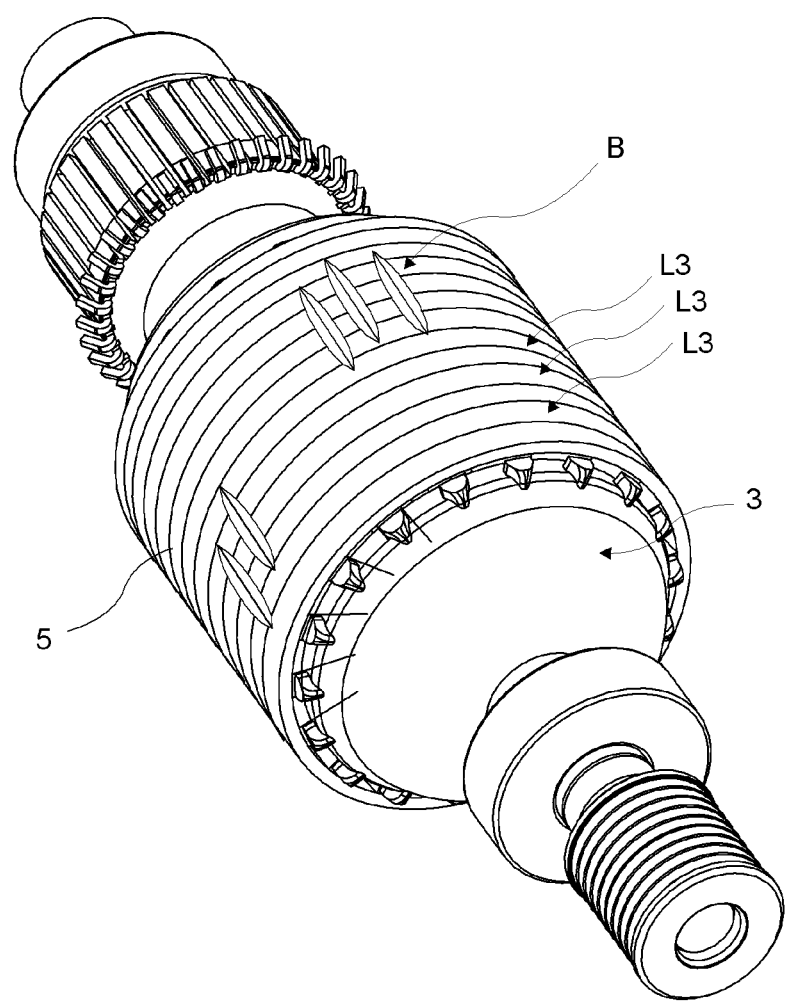

FIG. 5—is the perspective view of a rotor.

The elements illustrated in the figures are numbered as follows:

1. Electric motor
2. Stator
3. Rotor core
4. Winding slot
5. Rotor sleeve
6. Locking protrusion The electric motor (1) comprises a stator (2) that creates a magnetic field and formed of ferromagnetic laminations (L1) stacked on top of each other, and a rotor core (3) disposed inside the stator (2) and formed of ferromagnetic laminations (L2) stacked on top of each other.

The rotor core (3) comprises more than one winding slot (4) along its circumference, wherein the windings are placed and more than one radial teeth that extend outside and situated between the winding slots (4).

The electric motor (1) of the present invention comprises a rotor sleeve (5) secured press-fittingly on the cylindrical outer circumference of the rotor core (3), covering the winding slots (4) and the windings, formed of ring shaped ferromagnetic laminations (L3) stacked on top of each other (FIGS. 1-4).

The inner diameter (r) of the rotor sleeve (5) is sized to be approximately same as the outer diameter of the rotor core (3). The outer diameter (R) of the rotor sleeve (5) is smaller than inner diameter of the stator (2) such that an air gap (G) remains between itself and the stator (2).

The laminations (L3) forming the rotor sleeve (5) are produced simultaneously in the same lamination die as the stator (2) laminations (L1) and the rotor core (3) laminations (L2), from the same steel sheet material by stamping operation and cost advantage is provided since a separate lamination die or production method is not used for the rotor sleeve (5).

The rotor sleeve (5) comprises more than one locking protrusion (6) arranged on each lamination (L3), so that the laminations (L3) are locked to each other during the stamping operation in the lamination die forming a stacked structure.

During the production of the electric motor (1) of the present invention, the stator (2) laminations (L1), rotor core (3) laminations (L2) and the rotor sleeve (5) laminations (L3) are stamped from the same steel sheet material, the stacked laminations (L1), (L2), (L3) are grouped separately and the stator (2), rotor core (3) and the rotor sleeve (5) become stacks separate from each other. After the winding process of the winding slots (4) is performed, the rotor sleeve (5) is secured press-fittingly on the cylindrical outer circumference of the rotor core (3) and shrinking methods are used for the press-fitting process.

During the production of the electric motor (1), after the processes of winding the rotor core (3) and securing the rotor sleeve (5) on the rotor core (3), the balancing process is performed by opening balancing grooves (B) on the outer circumference of the rotor sleeve (5) by the balance machine (FIG. 5). Balancing grooves (B) can be opened easily on any designated region since there is no discontinuity on the outer circumference of the rotor sleeve (5) since not divided by winding slots (4) like the outer circumference inside the rotor sleeve (5) of the bare rotor core (3).

The wall thickness ((R-r)/2) of the rotor sleeve (5) is greater than the maximum depth of the balancing groove (B). Thus, while opening balancing grooves (B) on the rotor sleeve (5), the balancing groove (B) is maintained not to project from the rotor sleeve (5) to the rotor core (3). Since the rotor sleeve (5) is formed of stacked laminations (L3), uniform flux transmittance is provided even if the wall thickness ((R-r)/2) is increased and eddy currents are prevented. The rotor sleeve (5) does not have to be very thin as in conventional technique. The wall thickness ((R-r)/2) of the rotor sleeve (5) can be increased without flux transmittance problems and balancing grooves (B) of any depth can be opened on the rotor sleeve (5) permitted by the ((R-r)/2) wall thickness thereof.

In the electric motor (1) of the present invention, the rotor sleeve (5) configured of stacked laminations (L3) act as the continuance of the rotor core (3), providing a uniform magnetic flux transmittance between the rotor core (3) and stator (2), preventing eddy currents in the axial direction. By means of the rotor sleeve (5), the geometric discontinuity formed on the outer circumference of the rotor core (3) by the winding slots (4) and the discontinuity of the ferromagnetic material distribution are eliminated, reducing noise and vibrations. After the rotor sleeve (5) is secured on the rotor core (3), no other additions are made and mass balance quality of the rotor core (3) is increased since the balancing process performed on the rotor sleeve (5) is the last process.

The invention claimed is:

1. An electric motor (1) that comprises a stator (2) that creates a magnetic field and formed of ferromagnetic laminations (L1) stacked on top of each other, and a rotor core (3) disposed inside the stator (2) and formed of ferromagnetic laminations (L2) stacked on top of each other, having more than one winding slot (4) arranged along the circumference thereof, wherein the windings are placed, and characterized by a rotor sleeve (5) secured press-fittingly on the cylindrical outer circumference of the rotor core (3), covering the winding slots (4) and the windings, formed of ring shaped ferromagnetic laminations (L3) stacked together on top of each other without discontinuity.

2. An electric motor (1) as in claim 1, characterized by the rotor sleeve (5) with inner diameter (r) sized to be approximately same as the outer diameter of the rotor core (3) and the outer diameter (R) being smaller than inner diameter of the stator (2) such that an air gap (G) remains between itself and the stator (2).

3. An electric motor (1) as in claim 1, wherein each rotor sleeve lamination (L3) further comprises more than one locking protrusion (6), so that the laminations (L3) are locked to each other during a stamping operation forming a stacked structure.

4. An electric motor (1) as in claim 1, characterized by the rotor sleeve (5) comprising balancing grooves (B) opened on the outer circumference after the winding processes of the winding slots (4) and securing the rotor sleeve (5) on the rotor core (3) are performed.

5. An electric motor (1) as in claim 4, characterized by the rotor sleeve (5) having a wall thickness ((R-r)/2) that is greater than the maximum depth of the balancing groove (B).

6. An electric motor (1) as in claim 2, wherein each rotor sleeve lamination (L3) further comprises more than one locking protrusion (6), so that the laminations (L3) are locked to each other during a stamping operation forming a stacked structure.

7. An electric motor (1) as in claim 6, characterized by the rotor sleeve (5) comprising balancing grooves (B) opened on the outer circumference after the winding processes of the winding slots (4) and securing the rotor sleeve (5) on the rotor core (3) are performed.

8. An electric motor (1) as in claim 2, characterized by the rotor sleeve (5) comprising balancing grooves (B) opened on the outer circumference after the winding processes of the winding slots (4) and securing the rotor sleeve (5) on the rotor core (3) are performed.

9. An electric motor (1) that comprises a stator (2) that creates a magnetic field and formed of ferromagnetic laminations (L1) stacked on top of each other, and a rotor core (3) disposed inside the stator (2) and formed of ferromagnetic laminations (L2) stacked on top of each other, having more than one winding slot (4) arranged along the circumference thereof, wherein the windings are placed, and characterized by a rotor sleeve (5) having an outer circumference secured press-fittingly on the cylindrical outer circumference of the rotor core (3), covering the winding slots (4) and the windings, formed of ring shaped ferromagnetic laminations (L3) stacked on top of each other wherein there is no tubular discontinuity on the rotor sleeve (5).

10. An electric motor (1) as in claim 9, characterized by the rotor sleeve (5) with inner diameter (r) sized to be approximately same as the outer diameter of the rotor core (3) and the outer diameter (R) being smaller than inner diameter of the stator (2) such that an air gap (G) remains between itself and the stator (2).

11. An electric motor (1) as in claim 9, wherein each rotor sleeve lamination (L3) further comprises more than one locking protrusion (6), so that the laminations (L3) are locked to each other during a stamping operation forming a stacked structure.

12. An electric motor (1) as in claim 9, characterized by the rotor sleeve (5) comprising balancing grooves (B) opened on the outer circumference on any designated region of the rotor sleeve after the winding processes of the winding slots (4) and securing the rotor sleeve (5) on the rotor core (3) are performed.

13. An electric motor (1) as in claim 12, characterized by the rotor sleeve (5) having a wall thickness ((R−r)/2) that is greater than the maximum depth of the balancing groove (B).

14. An electric motor (1) as in claim 10, wherein each rotor sleeve lamination (L3) further comprises more than one locking protrusion (6), so that the laminations (L3) are locked to each other during a stamping operation forming a stacked structure.

15. An electric motor (1) as in claim 14, characterized by the rotor sleeve (5) comprising balancing grooves (B) opened on the outer circumference on any designated region of the rotor sleeve after the winding processes of the winding slots (4) and securing the rotor sleeve (5) on the rotor core (3) are performed.

16. An electric motor (1) as in claim 10, characterized by the rotor sleeve (5) comprising balancing grooves (B) opened on the outer circumference on any designated region of the rotor sleeve after the winding processes of the winding slots (4) and securing the rotor sleeve (5) on the rotor core (3) are performed.

17. An electric motor (1) that comprises a stator (2) that creates a magnetic field and formed of ferromagnetic laminations (L1) stacked on top of each other, and a rotor core (3) disposed inside the stator (2) and formed of ferromagnetic laminations (L2) stacked on top of each other, having more than one winding slot (4) arranged along the circumference thereof, wherein the windings are placed, and characterized by a rotor sleeve (5) having an outer circumference secured press-fittingly on the cylindrical outer circumference of the rotor core (3), covering the winding slots (4) and the windings, formed of ring shaped ferromagnetic laminations (L3) stacked on top of each other without discontinuity between the ring shaped ferromagnetic laminations (L3) and wherein the stator ferromagnetic laminations (L1), the rotor core ferromagnetic laminations (L2), and the rotor sleeve ferromagnetic laminations (L3) are stamped from the same steel sheet.

* * * * *